(12) United States Patent
Nedez

(10) Patent No.: US 6,409,910 B1
(45) Date of Patent: Jun. 25, 2002

(54) PROCESS FOR TREATING GAS OR LIQUIDS THAT ARE OBTAINED FROM CATALYTIC REFORMING

(75) Inventor: Christophe Nedez, Salindres (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/344,361

(22) Filed: Jun. 25, 1999

(30) Foreign Application Priority Data

Jun. 25, 1998 (FR) .............................. 98 08090

(51) Int. Cl.$^7$ .............................. C10G 67/06
(52) U.S. Cl. ............ 208/99; 208/264; 208/299; 208/289
(58) Field of Search .......... 208/99, 91, 262.1, 208/264, 278, 299, 301, 302, 289

(56) References Cited

U.S. PATENT DOCUMENTS

| | | | |
|---|---|---|---|
| 2,969,319 A | | 1/1961 | Sosnowski et al. ......... 208/139 |
| 4,902,842 A | * | 2/1990 | Kalnes ....................... 585/310 |
| 5,354,931 A | * | 10/1994 | Jan et al. ................... 585/264 |
| 5,378,444 A | * | 1/1995 | Akita et al. ............... 423/240 S |
| 5,565,092 A | * | 10/1996 | Pannell et al. ............. 208/262.1 |
| 5,589,148 A | * | 12/1996 | Otsuka et al. ............. 423/240 S |
| 5,643,545 A | * | 7/1997 | Chen et al. ................ 423/245.3 |
| 5,744,420 A | * | 4/1998 | Le Roarer et al. .......... 502/415 |
| 5,817,284 A | * | 10/1998 | Nakano et al. ........... 423/240 S |

FOREIGN PATENT DOCUMENTS

| EP | 0 643 319 | 3/1995 |
|---|---|---|
| FR | 2 292 512 | 6/1976 |
| FR | 2 584 734 | 1/1987 |

* cited by examiner

Primary Examiner—Bekir L. Yildirim
(74) Attorney, Agent, or Firm—Millen, White, Zelano & Braingan, P.C.

(57) ABSTRACT

The invention relates to a process for eliminating halogenated compounds that are contained in a gas or a liquid that comprises hydrogen and unsaturated hydrocarbons, in which the gas or the liquid is successively brought into contact with:

at least one catalyst for hydrogenation, then at least one adsorbent of halogenated compounds.

This gas or this liquid can be obtained from. a regenerative-type catalytic reforming.

20 Claims, No Drawings

PROCESS FOR TREATING GAS OR LIQUIDS THAT ARE OBTAINED FROM CATALYTIC REFORMING

CROSS-REFERENCE TO RELATED APPLICATION

This application may be related to Attorney Docket No. Pet-1778, entitled "Nouvelle Alumine, Son Procede De Preparation Et Son Utilisation En Tant Que Catalyseur, Support De Catalyseur Ou Adsorbant", based on French application 98/08.089 filed Jun. 25, 1998, inventors being Christophe Nedez, Jean-Luc Le Loarer and Bernard Taxil.

This invention relates to a process for treating gas or liquids that contain halogenated compounds, for example that are obtained from catalytic reforming.

In the petroleum industry, the purpose of catalytic reforming is to obtain hydrocarbons that have a high octane rating. This octane rating is proportionately higher as the hydrocarbon is branched, cyclic or aromatic. Hydrocarbon cyclization and aromatization reactions are therefore carried out during reforming.

These hydrocarbon cyclization and aromatization reactions conventionally took place in the presence of chlorinated, bimetallic, heterogenous catalysts. These chlorinated catalysts have an alumina base and most often comprise platinum and another metal such as, for example, tin, rhenium or iridium. The presence of chlorine in said catalysts is essential because, added to alumina, it ensures the overall acidity of the system and takes part in redispersing platinum over time, thus making it possible to stabilize the catalytic activity of the catalyst.

The use of chlorine, however, is not a problem-free solution. Actually, over time, partial elution of chlorine, in particular in the form of HCl, is noted. It is then necessary to refill the catalyst with chlorine. This elution also results in the presence of HCl and other chlorinated compounds in the gaseous and liquid effluents that are obtained from catalytic reforming, which can result, on the one hand, in a problem of corrosion of the installation, and, on the other hand, in the formation of other products that are undesirable and that have an adverse effect on the operation of the installation.

At the output of the reforming process, the effluents contain for the most part:

hydrogen that is obtained from the reforming reactions,
light saturated hydrocarbons (for example, methane or ethane),
traces of chlorinated compounds, in particular HCl, and traces of water.

The elimination of the chlorinated compounds is important for the reasons that are mentioned above, but also because the hydrogen that is obtained from the reforming can be used in other applications of the petroleum industry, for example, hydrotreatment. The recycled hydrogen is not to contain chlorinated compounds.

To eliminate the chlorinated compounds, the effluents of the reforming are usually treated by adsorbents, such as alumina, optionally doped by an alkaline or alkaline-earth compound.

New reforming processes have recently been developed. These so-called "regenerative" reforming processes, or reforming processes "of a new generation," operate under a pressure that is close to 3 to 15 bars, even less than 3 bars, contrary to standard reforming processes that operate under high pressure of about 20 bars, and even more.

At the output of regenerative catalytic reforming, traces of unsaturated hydrocarbons (such as ethylene, propylene, butene, butadiene) in addition to hydrogen, light hydrocarbons and traces of HCl and water are detected in the effluents.

When these effluents are then treated by alumina to eliminate the chlorinated compounds, it is noted that the unsaturated hydrocarbons transform at least partially into organochlorinated compounds that are in contact with the adsorbent, particularly alumina; these organochlorinated compounds in their turn and after multiple reactions with other organochlorinated and/or unsaturated compounds, result in oligomers of high molecular weight called "green oils."

These "green oils" cannot be eliminated by traditional adsorbents, and they migrate in the direction downstream from the adsorbent of the chlorinated compounds. The green oils can then plug the installation. From that time on, significant reduction of the service life of the adsorbent is noted: it can decrease by 4 to 5 times relative to that of the same adsorbent that is used in the absence of "green oils."

The object of this invention is to propose a process for eliminating gas or liquid chlorinated compounds that are obtained from regenerative catalytic reforming that limits and even suppresses the formation of halogenated oligomers and in particular the chlorinated oligomers that are called "green oils."

For this purpose, the invention relates to a process for eliminating halogenated compounds that are contained in a gas or a liquid, whereby said gas or liquid comprises hydrogen and unsaturated hydrocarbons, a process in which the gas or the liquid is successively brought into contact with:

at least one hydrogenation catalyst, then.
at least one adsorbent of halogenated compounds.

The process consists in introducing the gases or liquids that are to be treated into a reactor where they will successively meet a layer of a hydrogenation catalyst and a layer of adsorbent of halogenated compounds. The process can be used in a mixed bed: the two layers are then in the same reactor.

The process can also be used in two reactors, whereby the first comprises the hydrogenation catalyst, and the second the adsorbent of halogenated compounds.

The introduction of gases or liquids can be done at both the top and the bottom of the reactor from the moment that the gases or liquids are first brought into contact with the hydrogenation catalyst, then only with the adsorbent of halogenated compounds.

Any type of hydrogenation catalyst can be used. This hydrogenation catalyst is preferably selected from among the catalysts that comprise at least one metal of group VIII according to the periodic table, as published in the supplement to the Bulletin de la Société Chimique de France [Bulletin of the Chemical Society of France], No. 1, January 1966. In particular, it can be nickel, ruthenium or palladium. The palladium is the preferred doping metal.

These metals are generally deposited on a catalytic substrate, preferably on alumina or silica. The hydrogenation catalyst can come in the form of balls or extrudates, whereby the latter are preferably cylindrical or multilobar.

The hydrogenation catalyst can be doped by at least one element of column IB of the periodic table, as published in the supplement to the Bulletin de la Societe Chimique de France, No. 1, January 1966.

Likewise, any type of adsorbent of halogenated compounds can be used.

This is preferably alumina, and At can be selected from among:

the aluminas that comprise at least one element that is selected from among the alkalines and that are obtained from calcination at a temperature of at least 6000°C., the aluminas that comprise at least one element that is selected from among the alkaline-earths or the rare earths and that are obtained from calcination at a temperature of at least 500° C., the aluminas that comprise at least one metallic element that is selected from among the metals of groups VIII and/or columns IB and/or IIB of the periodic table, as published in the supplement to the Bulletin of the Société Chimique de France, No. 1, January 1966, preferably iron, nickel, copper and/or zinc, in a content per unit of mass of at most 45% by weight relative to the total weight of the alumina.

Alumina SAS-357 that is marketed by Procatalyse is particularly suitable.

In the case of a mixed bed, one skilled in the art knows how to adapt the amounts of hydrogenation catalyst and adsorbent that are necessary for treating gas or liquid. The hydrogenation catalyst can represent, for example, 1 to 60% by volume of the mixed bed.

The process according to the invention is suitable in particular for treating flows that have a composition such as: 80% by volume of hydrogen, about 10 ppm of HCl, about 30 ppm of $H_2O$ and hydrocarbons.

The unsaturated hydrocarbons can have an ethylene, propylene, butene or butadiene base.

The process according to the invention is particularly suitable for treating gases or liquids in which the halogenated compounds are chlorinated compounds.

Such gases or liquids can be obtained from catalytic reforming of the regenerative type or of a new generation.

After the gas or liquid that is to be treated is brought into contact with the hydrogenation catalyst and then the adsorbent of halogenated compounds, said catalyst and said absorbent can be regenerated. Thus, the unit that uses the process can consist of several reactors that operate in series or in parallel, whereby some of them operate in adsorption mode while the others operate in regeneration mode.

As far as regeneration is concerned, oxidation that is carried out with an $O_2/N_2$ mixture at a temperature of 200° C. makes possible an elimination of carbon-containing compounds that are deposited on the hydrogenation catalyst. The temperature increase profile and the oxygen concentration can be selected for reducing exothermy that is released at the time of oxidation. Furthermore, treatment with water vapor makes it possible to eliminate the chlorine that is retained in the adsorbent. A combination of these two treatments can be used.

The operating conditions of the reactors can be adapted by one skilled in the art based on the type of gaseous or liquid mixture that is to be treated.

For example, in the case of regenerative catalytic reforming, the pressure of the gaseous or liquid mixture that is to be treated is usually between 3 and 15 bars, and its temperature is between 20 and 50° C.

If the fluid that is to be treated is liquid, the VVH flow rate (hourly volumetric flow rate) can be between 1000 and 4000 $h^{-1}$. If the fluid that is to be treated is gaseous, the VVH flow rate may be between 5 and 30 $h^{-1}$.

The following examples illustrate the invention without, however, limiting its scope.

EXAMPLES

The hydrogenation catalysts that are used in the examples are as follows:

Catalyst A: alumina that contains 5000 ppm by weight of palladium, BET specific surface area: 250 $m^2/g$, total pore volume: 0.65 ml/g, balls with a grain size of between 4 and 6 mm, Catalyst B: alumina that contains 3100 ppm by weight of palladium, BET specific surface area: 75 $m^2/g$, total pore volume: 0.65 ml/g, balls with a grain size of between 2 and 4 mm.

The adsorbents of halogenated compounds that are used in the examples are as follows:

alumina 1: activated alumina 2–5 of grade P that is marketed by Procatalyse, specific surface area: 349 $m^2/g$, Na rate: 0.2% by weight, balls with a grain size of between 2 and 5 mm, alumina 2: SAS-357 alumina that is marketed by Procatalyse, specific surface area: 147, $m^2/g$, Na rate: 6.7% by weight, balls with a grain size of between 2 and 5 mm.

BET specific surface area is defined as the surface area that is determined by adsorption of nitrogen according to the ASTM D 3663-78 standard that was established starting from the BRUNAUER-EMMETT-TELLER method that is described in the periodical "The Journal of the American Chemical Society," 60, 309 (1938).

Total pore volume (TPV) is measured in the following way: the values of the grain density and of the absolute density are determined: grain densities (Dg) and absolute densities (Da) are measured by the pycnometry method respectively with mercury and helium, and the TPV is provided by formula:

$$\frac{1}{Dg} - \frac{1}{Da}.$$

Placed in a reactor is:

either a simple bed of 1 g of adsorbent that is able to eliminate the halogenated compounds, or a mixed bed that consists of:

on the one hand, 0.3 g of hydrogenation catalyst, and on the other, 1 g of an adsorbent that is able to eliminate the halogenated compounds.

The reactor is kept at 50° C. under atmospheric pressure. A hydrogen flow is circulated in a closed loop (mounting volume; 2.6 liters), and this flow contains:

2% by volume of propylene, 12 mmol of HCl, and 41 mmol of water.

In the case of the mixed bed, the flow is introduced to pass first to the hydrogenation catalyst, then to the adsorbent that is able to eliminate the halogenated compounds.

An examination of the aqueous phase is done in situ by infrared to follow the possible disappearance of propylene and the simultaneous appearance of propane, and even chloropropane. The chloropropane generation is the sign of the first step in the formation of "green oils."

The results that are obtained are summarized within Table 1.

TABLE 1

| Example | Mixed Bed | Hydrogenation Catalyst | HCl Adsorbent | Amount of Organochlorinated [Compounds] Formed |
|---|---|---|---|---|
| 1 | no | — | alumina 1 | 1.0 mmol after 4 hours |
| 2 | no | — | alumina 2 | 0.8 mmol after 24 hours |
| 3 | yes | A | alumina 1 | 0 mmol after 24 hours |
| 4 | yes | A | alumina 2 | 0 mmol after 24 hours |
| 5 | yes | B | alumina 2 | 0 mmol after 24 hours |

The examples above show that the prior use of a hydrogenation catalyst prevents the generation of chloropropane, first step toward the formation of "green oils."

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/08.090, are hereby incorporated by reference.

From the foregoing description, one skilled in the art can easily ascertain the essential characteristics of this invention, and without departing from the spirit and scope thereof, can make various changes and modifications of the invention to adapt it to various usages. and conditions.

What is claimed is:

1. A process for eliminating halogenated compounds contained in a gas or a liquid, whereby said gas or liquid comprises hydrogen and unsaturated hydrocarbons, comprising successively bringing the gas or liquid into contact with:
   at least one hydrogenation catalyst, then
   at least one adsorbent of halogenated compounds having an alumina base.

2. A process according to claim 1, wherein the hydrogenation catalyst is selected from among the catalysts that comprise at least one metal of group VIII of the periodic table.

3. A process according to claim 1, wherein the hydrogenation catalyst is doped by at least one element of column IB of the periodic table.

4. A process according to claim 1, wherein the adsorbent of halogenated compounds comprises at least one element that is selected from among the alkali metals, and that are obtained from calcination at a temperature of at least 600° C.

5. A process according to claim 1, wherein the adsorbent of halogenated compounds comprises at least one element that is selected from among the alkaline-earths or the rare earths and that are obtained from calcination at a temperature of at least 500° C.

6. A process according to claim 1, wherein the adsorbent of halogenated compounds comprises at least one metallic element that is selected from among the metals of groups VIII and/or columns IB and/or IIB of the periodic table, in a content per unit of mass of at most 45% by weight relative to the total weight of the alumina.

7. A process according to any claim 1, wherein the process is used in a mixed bed.

8. A process according to claim 7, wherein the hydrogenation catalyst represents 1 to 60% by volume of the mixed bed.

9. A process according to claim 1, wherein the process is conducted in two reactors, whereby the first comprises the hydrogenation catalyst, and the second comprises the adsorbent of halogenated compounds.

10. A process according to claim 1, wherein the halogenated compounds are chlorinated compounds.

11. A process according to claim 1, wherein the gas or the liquid is obtained from regenerative-type catalytic reforming.

12. A process according to claim 1, wherein after the gas or liquid that is to be treated is brought into contact with the hydrogenation catalyst and then the adsorbent of halogenated compounds, said catalyst and said absorbent are regenerated.

13. A process according to claim 6, wherein said metallic element comprises at least one of iron, nickel, copper or zinc.

14. A process according to claim 1, wherein the adsorbent comprises at least one element of column IB of the periodic table.

15. A process according to claim 6, wherein the hydrogenation catalyst is selected the catalysts that comprise at least one metal of group VIII of the periodic table.

16. A process according to claim 15, wherein the hydrogenation catalyst is doped by at least one element of column IB of the periodic table.

17. A process according to claim 1, wherein said at least one hydrogenation catalyst comprises palladium.

18. A process for eliminating halogenated compounds contained in a gas or a liquid, whereby said gas or liquid comprises hydrogen and unsaturated hydrocarbons, comprising successively bringing the gas or liquid into contact with:
   at least one hydrogenation catalyst comprising nickel, ruthenium or palladium, then
   at least one adsorbent of halogenated compounds comprising an alumina base, and an element from group IB of the periodic table wherein the element is in a content per unit of mass of at most 45% by weight relative to the total weight of the alumina.

19. A process according to claim 14, wherein the adsorbent further comprises at least one element of column IIB of the periodic table.

20. A process according to claim 19, wherein the adsorbent further comprises at least one element from Group VIII of the periodic table.

* * * * *